ID="N"
UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT PYROXYLIN COMPOSITION OF MATTER.

SPECIFICATION forming part of Letters Patent No. 622,292, dated April 4, 1899.

Application filed December 28, 1898. Serial No. 700,492. (No specimens.)

*To all whom it may concern:*

Be it known that I, JOHN H. STEVENS, of the city of Newark, county of Essex, and State of New Jersey, have invented certain new and useful Improvements in Transparent Pyroxylin Compositions of Matter, of which the following is a specification.

Pyroxylin is a substance well known as the product obtained by treating cellulose fiber with mixtures of nitric and sulfuric acids. The most highly-nitrated pyroxylins are explosive and of little or no solubility in the usual solvents, such as ether alcohol, camphor-spirits, and wood-spirit. The lower nitration products, while inflammable, are relatively non-explosive. They are also soluble in the various pyroxylin solvents, such as those mentioned. The soluble varieties have been dissolved in appropriate solvents and used as varnishes, lacquers, and waterproofing solutions or in stiffer masses and in connection with dyes or pigments for the purpose of making compounds in imitation of various natural and other substances, such as tortoise-shell, glass, amber, &c. When pure and well washed, the different grades of pyroxylin are neutral—that is, they possess no acid reaction. Nevertheless they are subject to an acid decomposition, especially under the influence of time or elevated temperatures, and this decomposing tendency is imparted to their converted products, so that pyroxylin products made with the aid of solvents have been more or less affected by the acid evolved in the course of time. The art is in possession of but very few successful preserving agents for pyroxylin, and even these by reason of their peculiar properties or reaction with pyroxylin are often more or less objectionable. Consequently an enlargement of the list of useful antacids for these purposes is necessary and desirable.

The object of the present invention is to furnish the art with a new antacid agent to be used with pyroxylin compounds for the purpose of preserving them against deterioration or chemical changes caused by acid decomposition.

In making flowable compounds, such as varnishes or waterproofing solutions, I introduce barium butyrate dissolved in alcohol or in wood-spirit. In making stiffer compounds, such as those which contain so little solvent that they have to be masticated in rolls or other machinery, I introduce the barium butyrate, preferably in solution, either in wood-spirit or in grain-alcohol, although it can be introduced in the form of powder, in which case the mastication with the solvents and other ingredients results in a thorough incorporation of the salt.

I have employed barium butyrate with success in forming thin transparent sheets and also pyroxylin imitations of clear shell and find that it possesses advantages over some of the antacids heretofore used. For instance, urea-pyroxylin compounds are liable to a smearing of the surface of the sheets made from them and a staining or smutching of the polishing-plates or metal dies. Urea-pyroxylin compounds are also apt to blister easily under heat. In using the barium butyrate these defects do not occur, and sheets made with this salt as the preserving agent present a better surface and the polishing-plates last longer than is the case with urea compounds. The barium-butyrate mixtures also remain homogeneous under heat.

The art of manufacturing pyroxylin compositions is sufficiently well known, and it is therefore unnecessary for me to state any more in regard to the different mixtures, manipulations, and applications of pyroxylin and its compounds.

As this invention embraces only transparent compounds, I confine myself to using only such proportions as my experiments have demonstrated are useful for the purpose. I find that one per cent., by weight, to the amount of pyroxylin is a good average proportion. Two per cent. will give increased stability, but with a slight tendency to loss of high transparency. Hence I do not exceed five per cent. in any of my compositions. Proportions beyond five per cent. would make a material so clouded and discolored that it would be useless for transparents. Less than one per cent. can be used in compounds that do not require high stability—for molding under heat, for instance—or those which would be benefited by the excellent transparency given by small proportions—say one-half of one per cent.

The art of manufacturing the transparent pyroxylin compositions is also well known, as is also the difficulty which the operators have experienced in making these compositions so that they would be unchangeable by time or the influence of elevated temperatures, such as are used in molding. The many antacid substances used for these purposes have, as a rule, failed to give the requisite transparency either by lack of solubility in the menstrua employed or non-compatibility in other respects.

While I am unable to explain why a basic substance already saturated with a corrosive acid can act as a preserving agent and prevent the deleterious action of the corrosive nitrocompounds in decomposing pyroxylin, my experiments have nevertheless demonstrated this to be a fact. I can only state that it seems to depend on the nature of the acid or other radical held in combination with the base in the preserving agent.

Perfect solubility of the salt or compound in the solvent employed and the ability to form highly-transparent effects do not give the salt or compound antacid power, for I have found that chlorid of calcium, for instance, dissolves in wood-spirit and forms a highly-transparent combination with the pyroxylin compounds, while it is of no use for antacid purposes. Chlorid-of-calcium compounds do not possess the proper surface effects. They attract moisture and become wet on the surface, which property would prevent the sale of such articles as tortoise-shell combs, amber pipe-bits, or transparent sheets for decorative purposes, for all of which my invention is specially applicable.

While the solution of chlorid of calcium on the surface can be washed away to some extent, it is always liable to exude from the body of the material and form fresh deposits. Such materials are either incapable of polish or will not retain their polish by reason of this exudation.

I am aware that butyric acid belongs to the class of monatomic fatty acids of which acetic acid is a member, and that acetate of barium has possibly been suggested as an equivalent of calcium chlorid, and also oxalic, citric, and carbolic acids, to be used in alcoholic solution as a solvent of certain kinds of pyroxylin.

While the acetate is a distinct substance from the butyrate, nevertheless even considering its chemical relationship the suggestion of its use in the large proportions necessary to convert a pyroxylin of peculiar solubility into the compounds suggested would neither disclose its value as an antacid in ordinary transparent compositions nor its effect in small proportions. In fact, while experimenting in a wide field to find useful antacid substances I have discovered that barium acetate possesses a moderate amount of preserving power, but that it is practically useless for this purpose in compounds which permit the free transmission of light, owing to its tendency to cloud them even in a one-per-cent. proportion. Similarly I have discovered that the formate and valerate of barium, which are also chemically related to the butyrate of barium, while possessing antacid power, are also for this reason not practically fitted for use as preservers in transparent compounds.

The butyrate of barium can be mixed or combined with other antacid substances or neutral salts without losing its preservative power.

Having fully instructed the operator in my invention, what I claim, and desire to secure by Letters Patent, is—

A transparent composition of matter containing pyroxylin and barium butyrate, substantially as described.

JOHN H. STEVENS.

Witnesses:
 WALTER P. LINDSLEY,
 M. R. EISELE.